United States Patent [19]

Nagano et al.

[11] Patent Number: 5,614,705
[45] Date of Patent: Mar. 25, 1997

[54] DEVICE FOR OPTICALLY READING OUT INFORMATION BY USE OF LASER BEAM

[75] Inventors: Shinji Nagano, Hachioji; Asako Kashima, Sagamihara; Akira Osanai; Teruaki Sugata, both of Hachioji; Hidenobu Kubo, Higashikurume; Tomomi Mashiko, Hachioji, all of Japan

[73] Assignee: Olympus Optical Co., Ltd., Tokyo, Japan

[21] Appl. No.: 494,490

[22] Filed: Jun. 26, 1995

[30] Foreign Application Priority Data

Jun. 29, 1994 [JP] Japan .................................. 6-148247
Jun. 29, 1994 [JP] Japan .................................. 6-148300

[51] Int. Cl.$^6$ ........................................................ G06K 7/10
[52] U.S. Cl. .................................... 235/467; 235/462
[58] Field of Search ............................... 235/462, 472, 235/467, 476, 477, 488; 359/208; 250/235, 234, 236; 318/375, 379

[56] References Cited

U.S. PATENT DOCUMENTS

| 4,825,057 | 4/1989 | Swartz et al. ............................. 235/472 |
| 5,115,120 | 5/1992 | Eastman ................................... 235/462 |
| 5,168,149 | 12/1992 | Dvorkis et al. ........................... 235/472 |
| 5,235,167 | 8/1993 | Dvorkis et al. ........................... 235/462 |
| 5,256,865 | 10/1993 | Wike, Jr. et al. ......................... 235/462 |
| 5,302,812 | 4/1994 | Li et al. .................................... 235/462 |
| 5,386,107 | 2/1995 | Dvorkis et al. ........................... 235/472 |
| 5,477,043 | 12/1995 | Dvorkis ..................................... 235/462 |

FOREIGN PATENT DOCUMENTS 2-178888  7/1990  Japan .

*Primary Examiner*—Donald T. Hajec
*Assistant Examiner*—Karl D. Frech
*Attorney, Agent, or Firm*—Frishauf, Holtz, Goodman, Langer & Chick

[57] ABSTRACT

An information reading apparatus comprises a laser diode, a mirror having a planar emission mirror unit for reflecting a laser beam emitted from the laser diode towards a target optical pattern and a concave condensing mirror unit, formed integral with the emission mirror unit, for condensing a reflection beam from the optical pattern in a predetermined direction, a photodetector, situated in such a position as not to interrupt the reflection beam from the optical pattern, for receiving the condensed reflection beam and converting the same to an electric signal, and a mirror driving apparatus for reflecting the laser beam from the scan mirror in a reciprocal rotational operation by an attractive force of a permanent magnet and a coil and a restoring force of a resilient body clamped by dampers on both sides, and reciprocally scanning the beam over a bar code within a predetermined range.

10 Claims, 6 Drawing Sheets

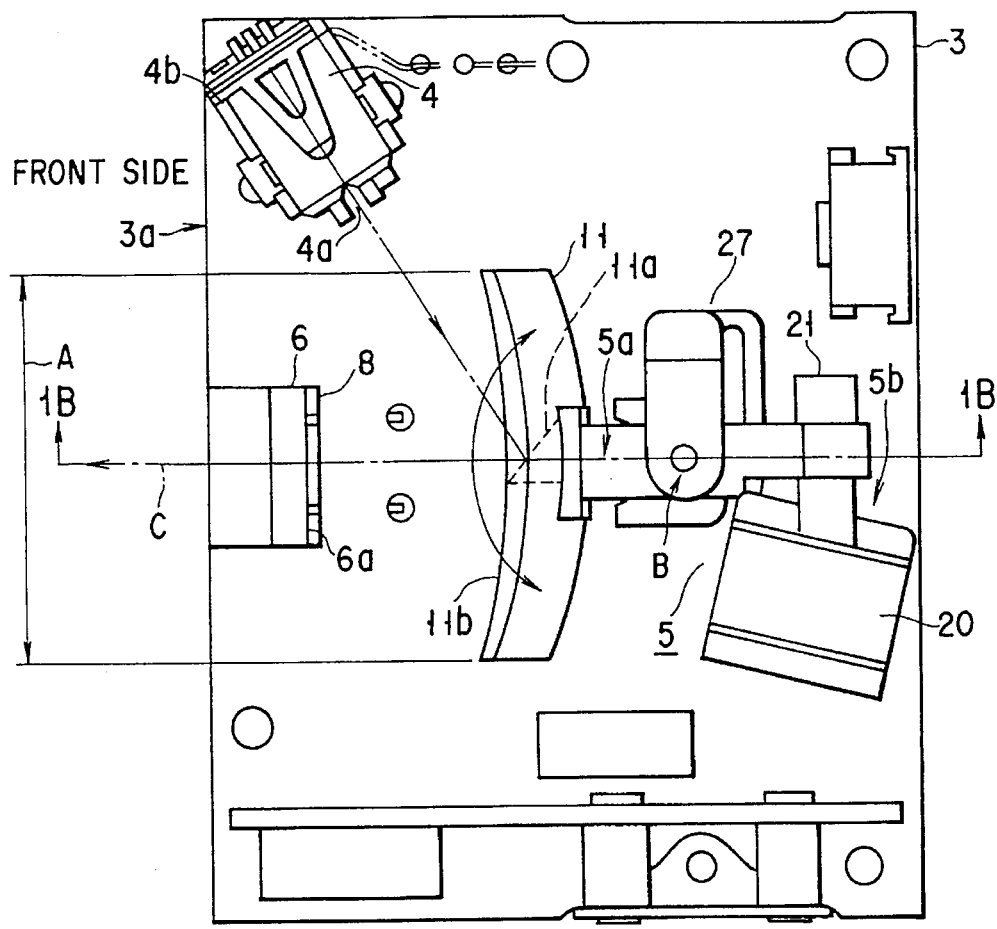
F I G. 1A
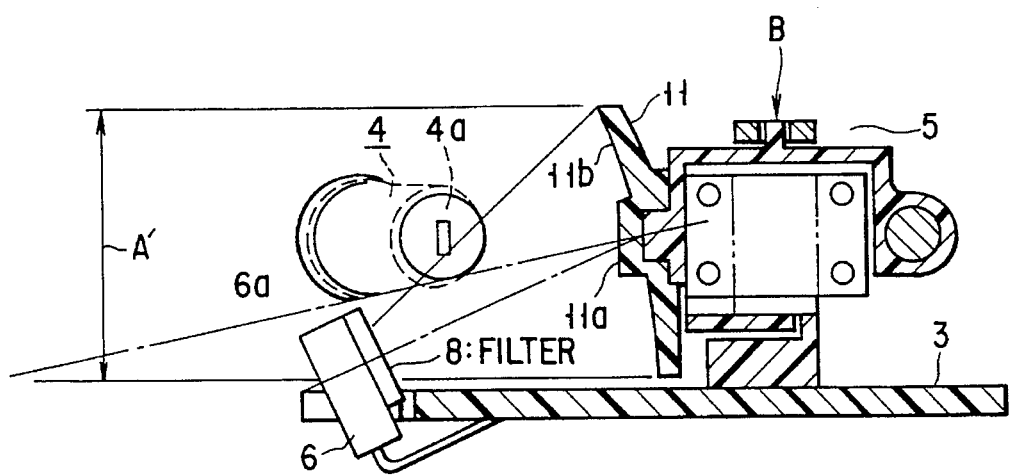
F I G. 1B

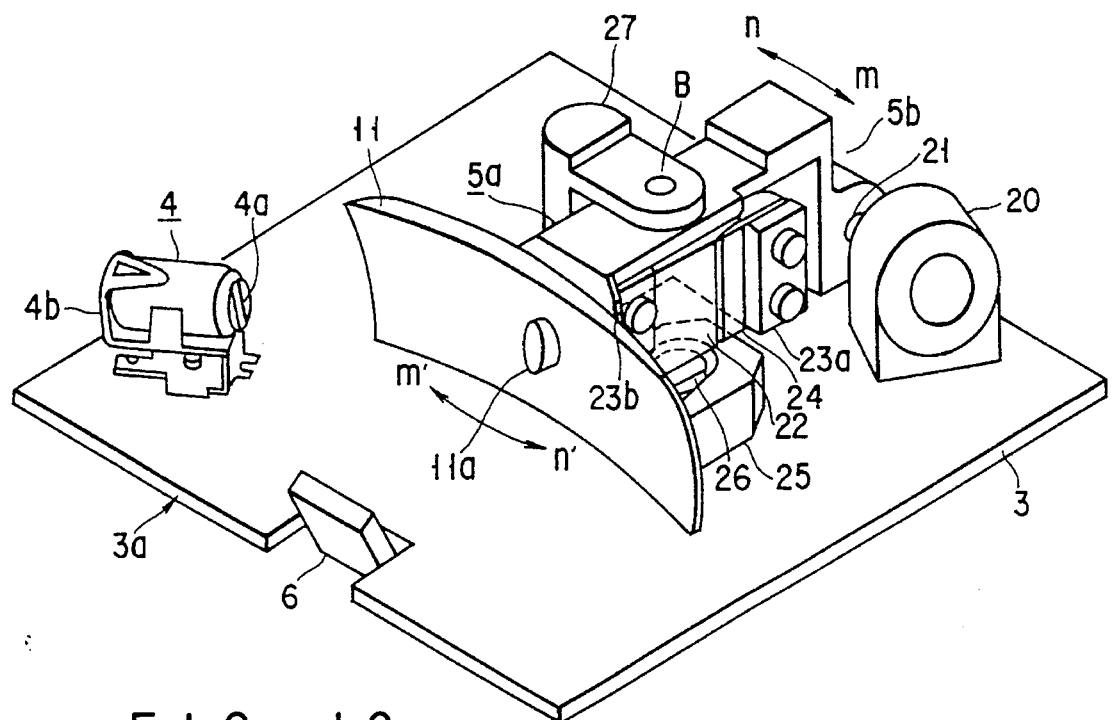
F I G. 1C
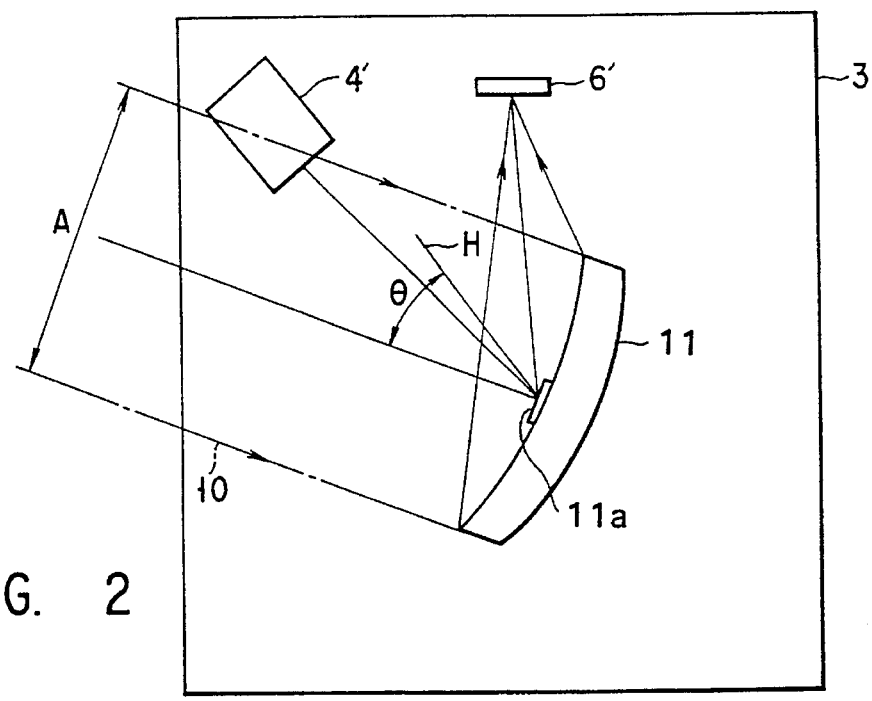
F I G. 2

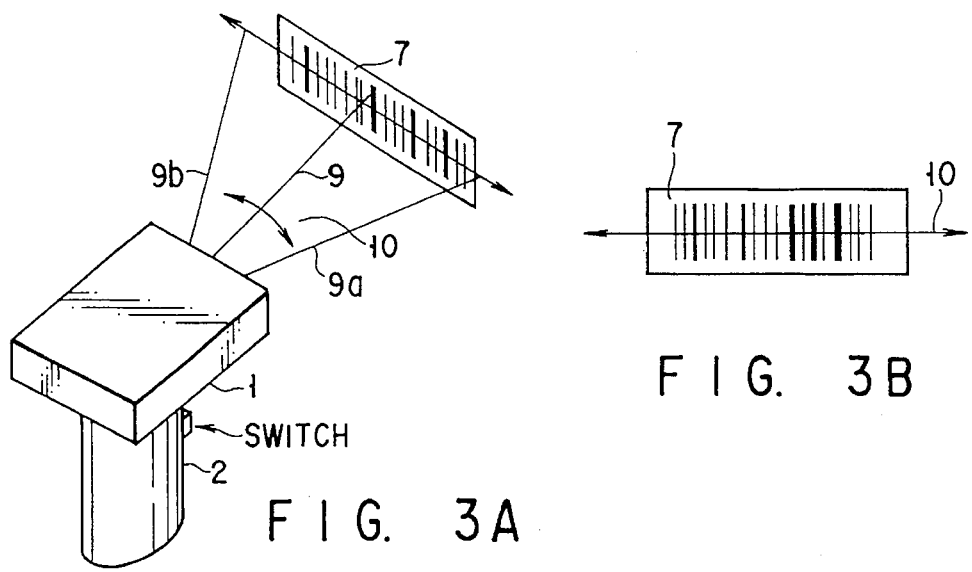
FIG. 3A
FIG. 3B
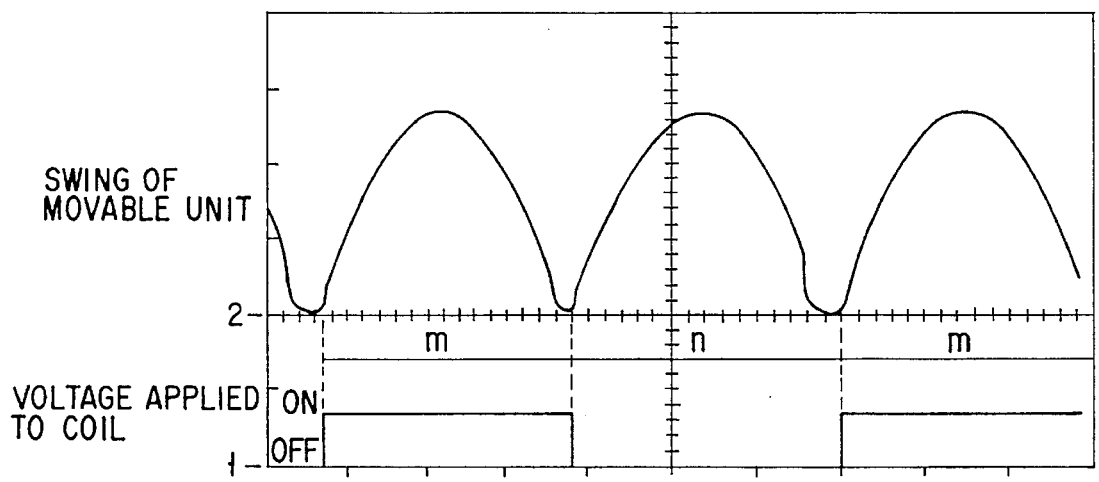
FIG. 4
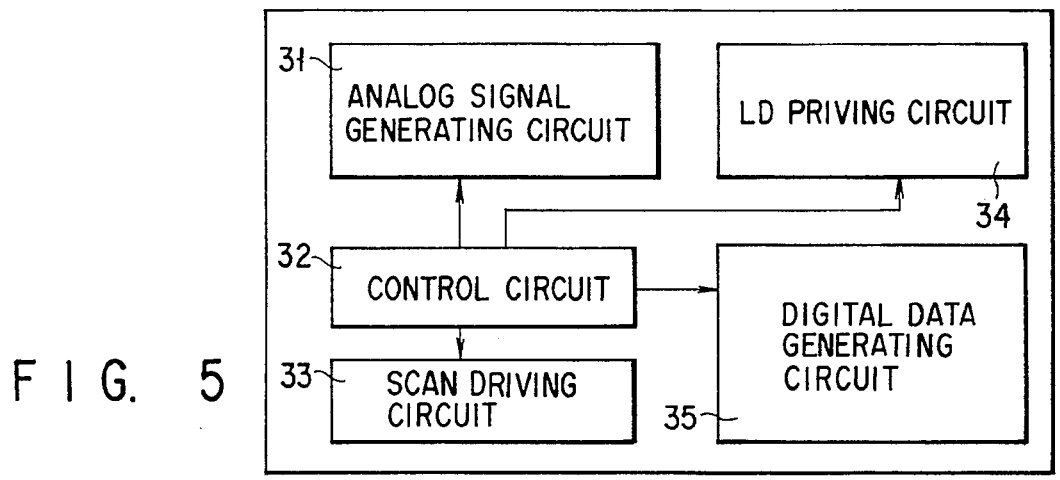
FIG. 5

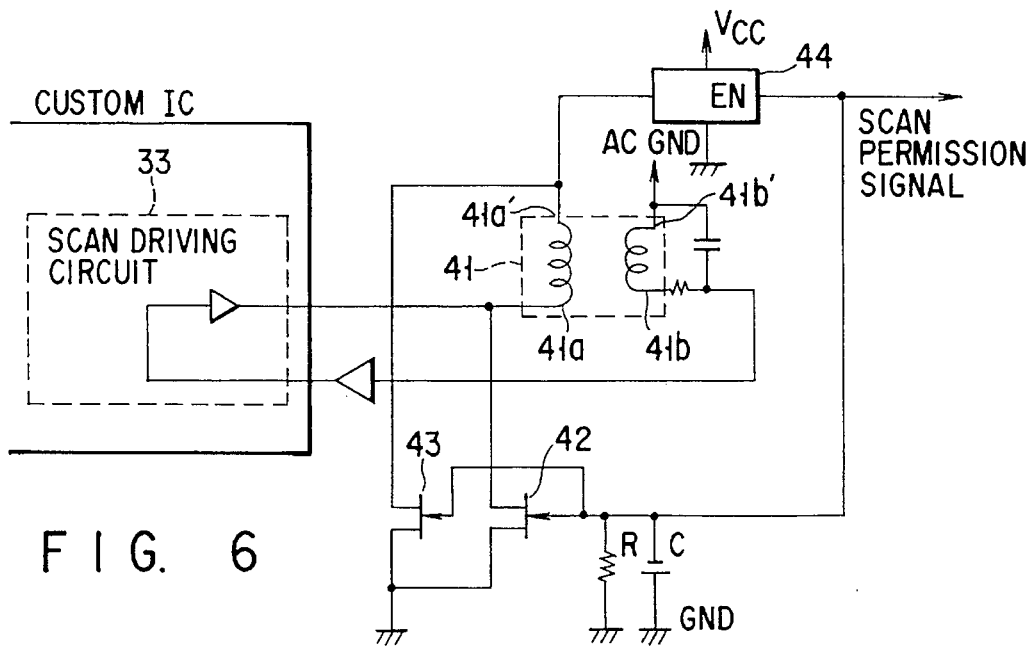
F I G. 6
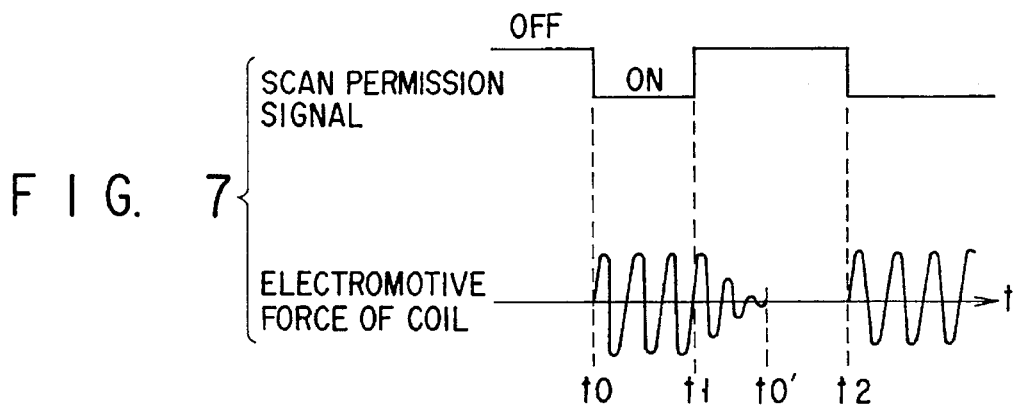
F I G. 7
F I G. 8A
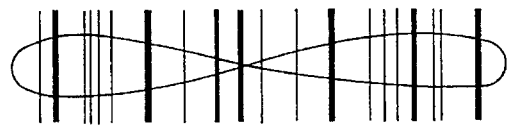
F I G. 8B
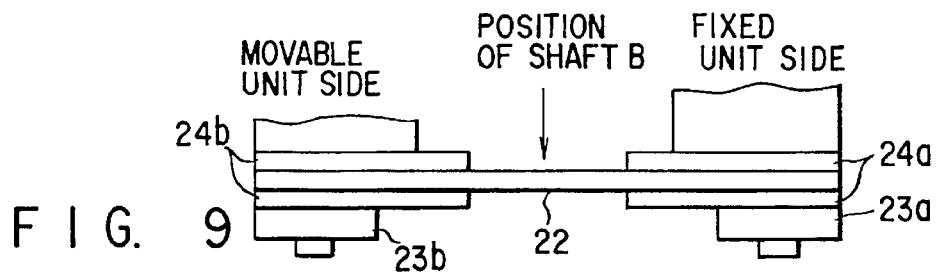
F I G. 9

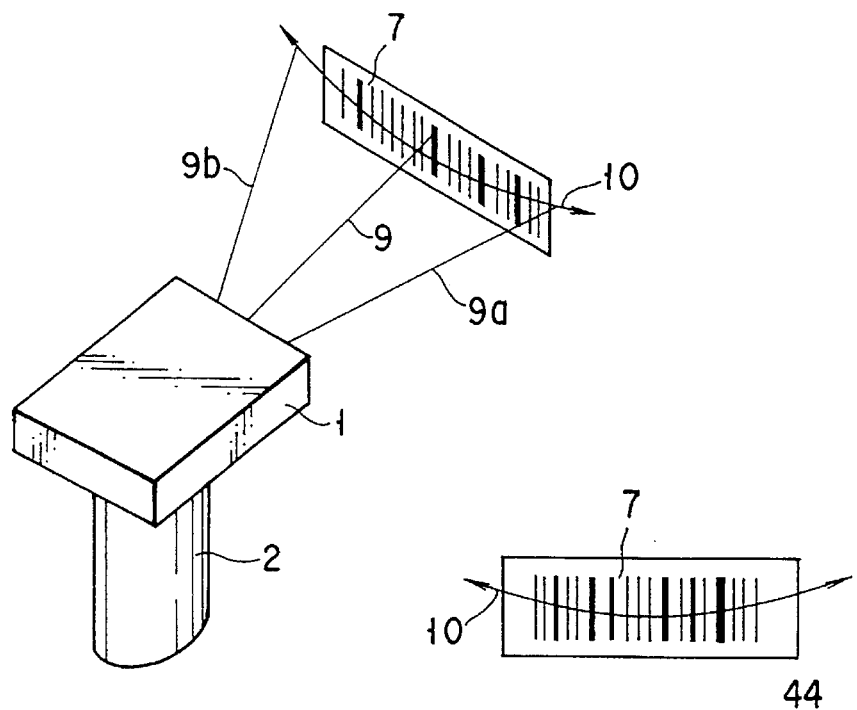
F I G. 1 2 A
PRIOR ART
F I G. 1 2 B
PRIOR ART
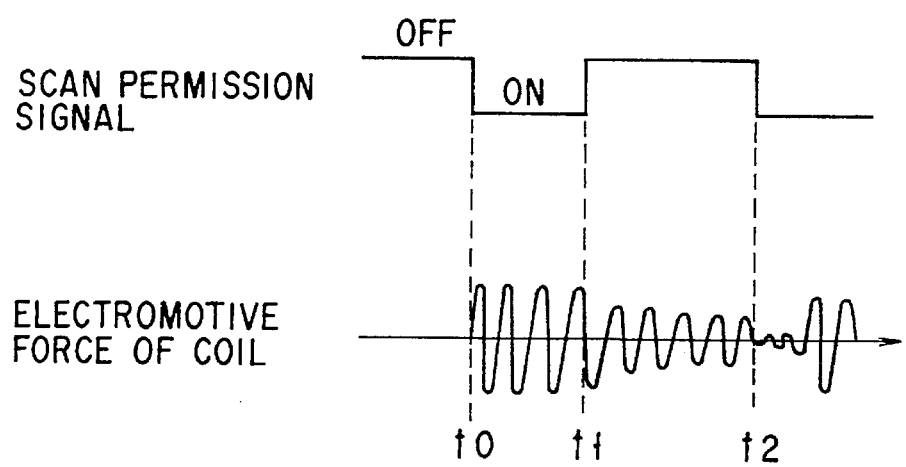
F I G. 1 3   PRIOR ART

DEVICE FOR OPTICALLY READING OUT INFORMATION BY USE OF LASER BEAM

BACKGROUND OF THE INVENTION

1. Field of the Invention

The present invention relates to an information reading apparatus for optically reading information from an optical pattern such as a bar code which is a printed code representing predetermined information.

2. Description of the Related Art

As an example of a label attached to an article for the purpose of identification, there is known a label with a bar code pattern comprising a series of bars and spaces with various widths, instead of characters and numerals. The bar code represents various information relating to the kind of articles and manufacturing data.

In a conventional information reading apparatus, an infrared beam, a laser beam or the like is radiated on a bar code and a difference in light reflection characteristics resulting from the difference in width between bars and spaces is detected. Thus, a bar code pattern is read and the original information is reproduced, thereby identifying the label or article.

Jap. Pat. Appln. KOKAI Publication No. 2-17888 discloses an example of such a conventional information reading apparatus. The disclosed apparatus comprises a handle unit and a head unit in a handy structure. Even if this information reading apparatus is not closely attached to a bar code, it can read the bar code by radiating a laser beam to a desired label at a distance of, e.g. several meters.

The head unit comprises a laser beam source, a scanning mirror for reflecting a laser beam emitted from the laser beam source, and a concave condensing mirror, formed integral with the scanning mirror, for converging an incident light beam at a photosensor. The scanning mirror is oscillated by a small-sized motor, like a pendulum.

In the above structure, the head unit is directed to the bar code and then a laser beam is emitted from the laser beam source. The laser beam is reflected by the oscillating scanning mirror and directed towards the bar code as a scanning beam.

In this case, since the scanning beam, i.e. the emitted laser beam, is reflected by the oscillating scanning mirror by the small-sized motor, the beam scans over the bar code.

The beam reflected by the bar code is converged at the photosensor by the concave condensing mirror within the head unit. After the beam is converted to an electric signal corresponding to a variation in optical characteristics of the beam, the electric signal is read by a signal processing circuit (not shown) as bar code information.

The above-described conventional information reading apparatus, however, has the following drawbacks.

Suppose, for example, that the laser beam source is positioned below a reference horizontal plane (i.e. an emission angle of a laser beam) and the scanning mirror is positioned such that the center of the scanning mirror overlaps the reference horizontal plane. In this case, a laser beam is emitted from the laser beam source at a predetermined angle to the reference horizontal plane and, after reflected by the scanning mirror, travels along the reference horizontal plane.

Because of the space for ensuring the emission angle of the laser beam, the thickness of the head unit increases by a degree corresponding to the emission angle and it is difficult to reduce the head unit in thickness and size. In addition, since both the laser beam source and photosensor are situated outside the optical path of the reflection beam from the bar code, it is also difficult to reduce the width of the apparatus.

The rotational shaft of the scanning mirror is not situated perpendicular to the optical axis of the laser beam reflected by the scanning mirror. Consequently, as shown in FIGS. 12A and 12B, the scanning beam is scanned over a bar code 7 along a curved locus. If the bar code 7 is located at a far distance, the beam cannot be scanned over all bars of the bar code 7. The defective scanning results in defective information reading.

The conventional information reading apparatus requires the space for installing a small-sized motor for oscillating the scanning mirror and a motor driving circuit. Even if the arrangement of the laser beam source and scanning mirror is changed to partially reduce the size of the reading apparatus, the size and weight of the entire apparatus cannot sufficiently be reduced owing to the presence of the space for the motor and motor driving circuit.

It is desirable to linearly scan the information reading beam (laser beam) at a constant speed in the direction of arrangement of the bars of the bar code, thereby reading the bar code. In order to stably oscillate the scanning mirror, a small-sized motor with high performance is required and therefore the manufacturing cost increases.

Furthermore, there is an idea that the scanning mirror is oscillated by using a resilient member such as a spring in lieu of the small-sized motor. In this case, however, even if the necessary scanning is completed, the oscillation of the resilient member does not stop immediately. If the next scanning operation is started before the oscillation stops, the scanning becomes unstable at the beginning and the bar code may be erroneously read. Therefore, it is necessary to stop the oscillation by some means each time the scanning operation is completed.

SUMMARY OF THE INVENTION

The object of the invention is to provide an information reading apparatus wherein a scan driving mechanism for scanning an information reading beam is reduced in size, weight and cost, linear scanning is performed, an optical pattern is read with high precision, and an oscillation is stopped in a short time period after completion of the scan.

According to the present invention, there is provided an information reading apparatus comprising: a light source for generating a laser beam; reflection means having an emission mirror unit for reflecting the laser beam and emitting the laser beam towards an optical pattern representing information in the form of a predetermined pattern, and a condensing mirror unit for condensing a reflection beam from the optical pattern in a predetermined direction the condensing mirror unit being integrally formed with the emission mirror unit; light detection means having a light receiving surface opposed to the condensing mirror unit, the light receiving surface being located within the range of an optical path of the reflection beam received by the condensing mirror unit in such a position as not to interrupt the emitted beam, the light receiving surface receiving the reflection beam condensed by the condensing mirror unit, and the received reflection beam being converted to an electric signal corresponding to the optical pattern; and a driving device for rotating the reflection means over a predetermined angle such that the laser beam reflected by the emission mirror unit is linearly scanned over the optical pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A shows the structure of a reading optical system built in an optical head unit of an information reading apparatus according to an embodiment of the present invention;

FIG. 1B is a cross-sectional view taken along line 1B—1B in FIG. 1A;

FIG. 1C is a perspective view showing the external appearance of the reading optical system;

FIG. 2 is a view for explaining a problem arising in the case where a photodetector is provided outside the range of the optical path of reflection light in the optical head unit shown in FIG. 1A;

FIG. 3A is a perspective view showing the state in which a bar code is being scanned by a scanning beam emitted from the reading optical system shown in FIG. 1A;

FIG. 3B is a plan view showing the locus of a scanning beam on the bar code;

FIG. 4 is a graph showing the relationship between the oscillation of a movable unit and the voltage applied to a coil, while the movable unit of a mirror driving apparatus is being oscillated;

FIG. 5 is a block diagram showing an example of the structure of a driving circuit for the information reading apparatus shown in FIG. 1A;

FIG. 6 shows the structure of a driving circuit including a braking device for the mirror driving apparatus in the information reading apparatus shown in FIG. 1A;

FIG. 7 shows the relationship between a scan permission signal and an electromotive force of a coil;

FIG. 8A and FIG. 8B show loci of the laser beam scanning the bar code, in the case where an elastic member provided in the mirror driving apparatus in this embodiment twisted, while restoring to the original shape thereof;

FIG. 9 shows a structure wherein a dumper is attached to the elastic member provided in the mirror driving apparatus in the present embodiment; the driving circuit including the braking device for FIG. 10 shows the structure of a modification of the mirror driving apparatus in the invention;

FIG. 12A is a perspective view showing the state in which a bar code is being scanned by a conventional information reading apparatus;

FIG. 12B is a plan view showing the locus of a scanning beam over the bar code; and FIG. 13 shows the relationship between a scan permission signal and an electromotive force of a coil in the prior art.

DETAILED DESCRIPTION OF THE PREFERRED EMBODIMENTS

Figure 10:
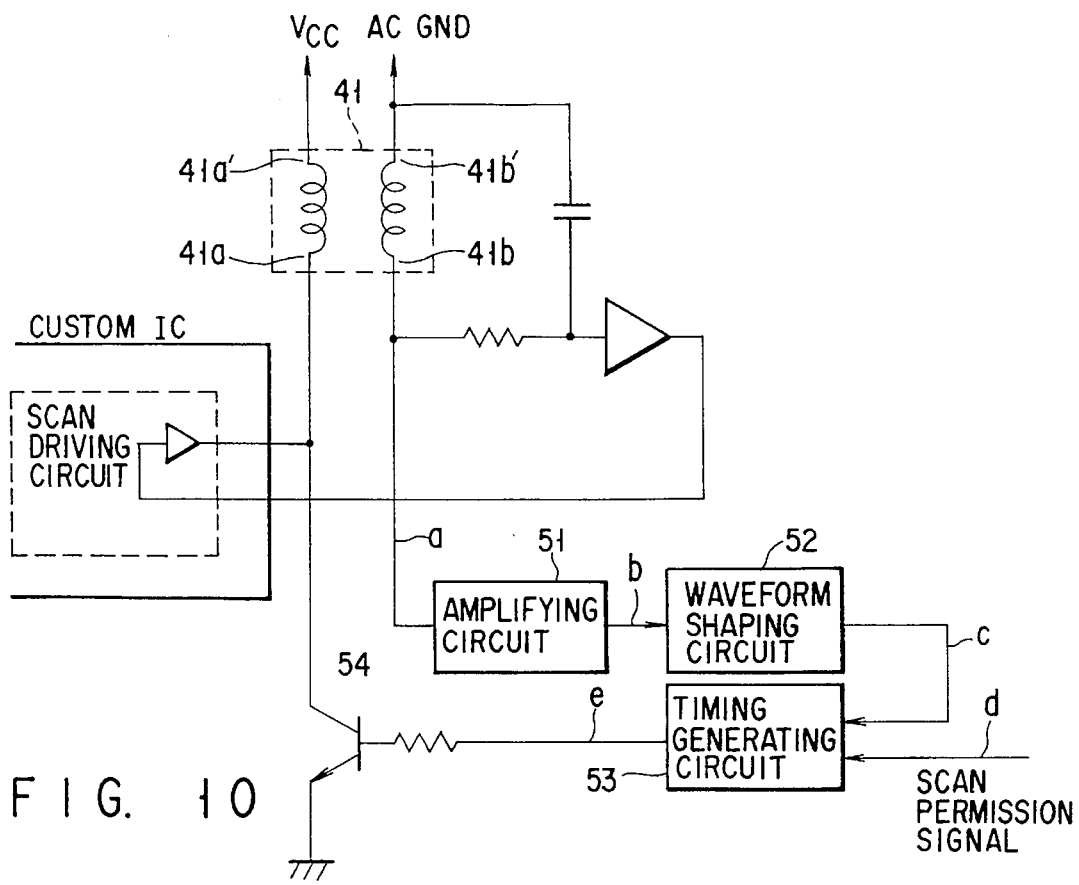

An embodiment of the present invention will now be described in detail with reference to the accompanying drawings.

FIG. 1A shows the structure of a scan driving mechanism (optical head section) for an information reading beam in an information reading apparatus according to the embodiment of the invention. FIG. 1B is a cross-sectional view taken along line 1B—1B in FIG. 1A. FIG. 1C shows the structure of the optical head section.

The information reading apparatus comprises, as shown in FIG. 3A, a head unit 1 for generating and scanning a laser beam, receiving a reflected beam, and reading information, and a handle unit 2 held by an operator.

The head unit 1 is provided with an optical system on a base plate 3. The optical system comprises a light source unit 4 for generating a laser beam, a mirror driving device 5 (described later) oscillating over a predetermined range while reflecting the laser beam, thereby scanning the laser beam on a bar code, and an information reading unit 6 for reading information from a reflection beam from the bar code.

The light source unit 4 is situated obliquely in front of the mirror driving device 5 (described later). The light source unit 4 comprises, for example, a laser diode (LD) and is held on a laser diode (LD) holder 4b such that the direction of emission of a laser beam can be freely chosen. An optical path between an emission point 4a and an emission mirror unit 11a is parallel to the major surface of the base plate 3. The LD holder 4b is formed of a metal, etc. and has a high heat radiation effect. In the present embodiment, the laser diode 4 is set such that a return beam from the bar code is made incident in a range A. The laser diode 4 is situated outside the range A of the return beam and on an obliquely front area of the base plate 3.

The information reading unit 6 photoelectrically converts a condensed reflection beam and outputs a signal corresponding to the pattern of the read bar code. The information reading unit 6 is situated in front of the mirror driving device 5 below the optical axis of the emitted laser beam at a position where the returning beam converges. A signal read by the information reading unit 6 is decoded to the original information by a processing apparatus such as a CPU (not shown).

With the above structure, the laser beam produced from the light source unit 4 is reflected at a predetermined angle by the oscillating plain mirror (hereinafter referred to as "emission mirror unit") of the scanning mirror 11 of the mirror driving device 5 and is made incident on the bar code. A reflection beam from the bar code is condensed by a concave mirror 11b (hereinafter referred to as "condensing mirror unit") and is made incident on the information reading unit 6.

The mirror driving device 5 comprises a movable unit 5a and a driving unit 5b. A shaft B extending perpendicular to the surface of the base plate 3 (i.e. perpendicular to the optical axis of the reading laser beam) is provided at a substantially central portion of the apparatus. The movable unit 5a is oscillated about the shaft B by a predetermined angle. The driving unit 5b is driven to oscillate the movable unit 5a in an m-n (m'-n') direction. In accordance with the oscillation of the movable unit 5a, the scanning mirror 11 attached to the front end portion of the movable unit 5 is oscillated by a predetermined angle.

The reflection surface of the emission mirror unit 11a of the scanning mirror 11 extends in parallel to the shaft B. In addition, the emission mirror unit 11a is situated such that in the initial state in which the scanning mirror 11 is static, the laser beam emitted from the laser diode 4 travels at right angles with a front end portion 3a of the base plate 3. The optical directivity path of the laser beam C output from the emission point 4a of the laser diode 4 via the emission mirror unit 11a is located in a plane parallel to the base plate 3.

The condensing mirror unit 11b condenses and reflects the reflection beam from the optical pattern of the bar code 7 shown in FIGS. 3A and 3B in the range A of the returning light beam and makes the reflected beam incident on a light receiving surface 6a of the information reading unit 6. The light receiving surface 6a is situated to intersect at right angles with the optical axis of the reflected beam from the condensing mirror unit 11b.

The information reading unit 6 comprises, for example, a photodetector (PD), etc. The information reading unit 6 is situated in a position which is set back from the range (A, A') of the reflection beam (i.e. returning beam) as much as possible and is below the optical path so as not to interrupt the optical path of the laser beam reflected by the emission mirror unit 11a.

A filter 8 passing only a laser beam with a predetermined frequency component is provided on the light receiving surface 6a of photodetector 6. Thus, external light such as light from indoor lighting equipment or solar light having frequency components different from those of the reflection beam from the optical pattern 7 is removed by the filter 8. Thus, the photodetector 6 converts only the reflection beam from the optical pattern 7 to an electric signal and can exactly detect light, independently from the influence of external light.

The reading operation of the information reading apparatus having the above structure will now be described with reference to FIGS. 1A, 1B and 1C and 3A, 3B.

The operator holds the handle unit 2 and directs the head unit 1 towards the target bar code 7. The switch in the handle unit 2 is turned on to drive the reading optical system in the head unit 1.

As a result, the reading laser beam 9 emitted from the emission point 4a of laser diode 4 is reflected by the emission mirror unit 11a and directed to the bar code 7 from the head unit 1. At this time, the mirror driving device 5 is driven, as shown in FIG. 1A, and the scanning mirror 11 is rotated about the shaft B over a predetermined angle. Thus, the laser beam 9 reflected by the emission mirror unit 11a is oscillated within a predetermined range (between 9a and 9b) as a scanning beam 10.

The emitted scanning beam 10 describes a locus in a direction perpendicular to the bars of the bar code 7. The scanning beam 10 is reflected by the bar code 7 and made incident on the head unit 1 as reflection beam. The reflection beam is condensed by the condensing mirror unit 11b and made incident on the light receiving surface 6a of photodetector 6.

At this time, only the reflection beam from the bar code 7 is passed through the filter 8 and made incident on the light receiving surface 25a, and converted to an electric signal corresponding to the optical characteristics of the reflection beam. Then, the electric signal is read as bar code information by a signal processing circuit (not shown).

In the present embodiment, the switch is turned on after the head unit 1 has been directed to the bar code 7. However, the head unit 1 may be directed to the bar code 7 after the switch has been turned on and the scanning beam 10 has been emitted. In this case, a plurality of bar codes can be read successively.

As has been described above, according to the information reading apparatus of the present embodiment, the optical directivity path of the laser beam output from the emission point 4a of the laser diode 4 via the emission mirror unit 11a is located in a plane parallel to the base plate 3. Thereby, the height of the information reading apparatus can be reduced. In addition, by situating the photodetector 6 below the optical path range of the reflection beam from the bar code 7, the width of the information reading apparatus can be reduced. Thus, the size of the entire apparatus can be reduced.

In the present embodiment, the photodetector 6 is not situated outside the optical path range of the reflection range A, for example, like photodetector 6' in FIG. 2. In FIG. 2, in order that the reflection beam may be guided to the photodetector 6', it is necessary to incline the scanning mirror 11 by an angle $\theta$ between the normal line H of the scanning mirror 11 and the scanning beam 10. Consequently, the effective area of the condensing mirror unit 11b of scanning mirror 11 for condensing the reflection beam is reduced to an area calculated by multiplying the actual area of the condensing mirror 11b by $\cos \theta$.

In particular, since the amount of the reflection beam condensed by the condensing mirror unit 11b to be utilized decreases, the optical reading performance would deteriorate and the scanning distance would decrease. In addition, the reading precision would lower and the bar code located at a distance could not be read.

In the present embodiment, however, the photodetector 6 is situated to face the reflection surface of the condensing mirror unit 11b. Therefore, the mirror area of the condensing mirror unit 11b can be used effectively.

Furthermore, since the shaft B of the scanning mirror 11 is situated perpendicular to the optical axis of the laser beam emitted from the laser diode 4 (i.e. perpendicular to the surface of the base plate 3), the scanning beam 10 reflected and emitted from the emission mirror unit 11a is scanned linearly in a direction perpendicular to the bars of the bar code 7. Accordingly, a long bar code can be scanned with no departure of the beam from the bars.

It is therefore possible to provide a compact information reading apparatus capable of exactly scanning the optical pattern and precisely reading the information, without influence of the arrangement of the optical pattern.

The mirror driving device 5 will now be described.

As is shown in FIGS. 1A, 1B and 1C, the mirror driving device 5 oscillates the scanning mirror by making use of magnetic force and a resilient body, thereby scanning the laser beam.

The mirror driving device 5 comprises the U-shaped movable unit 5a having the scanning mirror 11 fixed at one end thereof, and a driving unit 5b for supporting and rotating the movable unit 5a. The driving unit 5b supports the shaft B at the top and bottom thereof. The driving unit 5b comprises a permanent magnet 21 attached to the other end of the movable unit 5a, a hollow cylindrical electromagnet (hereinafter referred to as "coil") 20 in which the permanent magnet 21 can be inserted, and a resilient body 22 designed to return to a central point of the oscillation range by its own restoring force when the attractive force of the coil 20 is lost. In this embodiment, the resilient body 22 is formed of a thin metal plate, a polyester sheet or any other member serving as a plate spring.

Since the resilient body is used in the form of a thin plate, twist or warp may occur when the bent resilient body is restored to the original shape. If twist occurs when the resilient body is restored to the original shape, the laser beam is not radiated linearly in the direction of the arranged bar codes, for example, as shown in FIG. 8A. Thus, the beam is scanned along an irregular curve line. If the beam is scanned in a reciprocal manner, the beam describes a locus like horizontally situated letter "∞", as shown in FIG. 8B. In this case, the interval between the bars varies and erroneous reading may occur.

In the present embodiment, as shown in FIG. 9, resilient dampers 24a and 24b are attached to one or both sides of the resilient body 22 on the side of a resilient body fixing unit 23a provided on the fixed unit side and on the side of a resilient body fixing unit 23b provided on the movable unit side. The dampers 24a and 24b need to be provided so as not to vary the characteristic frequency of the resilient body 22. The length of each damper is set to be less than the distance between the resilient body fixing unit 23a and the shaft B. The dampers 24a and 24b should desirably be formed of a resilient thin plate of a metal, plastics, rubber, etc.

The rotational center (shaft B) of the movable unit 5a and the resilient body 22 has such a relationship that the center of the effective length of bending of the resilient body 22, except the fixed point, is aligned with the shaft B, and the axis of the alignment is perpendicular to the major surface (horizontal surface) of the base plate 3. Thus, the movable unit 5a rotates in parallel to the surface of the base plate 3.

The coil 20 comprises a sensor coil and a driving coil. In this embodiment, the coil 20 has a two-layer coil structure wherein the driving coil is wound inside and the sensor coil is wound outside. The sensor coil senses a magnetic force caused by the inserting/withdrawing movement of the permanent magnet 21, thereby determining the state of insertion/withdrawal (i.e. position of oscillation).

The movable unit 5a has an inverted "U" shape. One end portion of the movable unit 5a fixes the rear surface of the scanning mirror 11 and at this fixing point the resilient body fixing unit 23b is provided. The resilient body fixing unit 23b fixes one side of the resilient body 22. The other end portion of the movable unit 5a is provided with the cylindrical permanent magnet 21 in a direction crossing the movable unit 5a. The shaft B extending vertical to the surface of the base plate 3 is provided at the central portion of the movable unit 5a. The shaft B is supported by a support column 27. The movable unit 5a is rotatable over a predetermined angle about the shaft B.

A run-out reducing unit 26 for reducing rotational run-out of the shaft B is provided below the movable unit 5a. The run-out reducing unit 26 is fitted in a groove formed in a fixed unit 25 fixed on the base plate 3. Thus, excessive oscillation and run-out of the movable unit 5 is prevented.

The cylindrical coil 20 is situated at a position where the cylindrical permanent magnet 21 can be rotated and inserted into and withdrawn from the coil 20.

In the scanning driving mechanism of this embodiment, the movable unit 5a and driving unit 5b are coupled by the resilient body 22. The driving unit 5b rotatably supports the shaft B of the movable unit 5a. Both end portions of the movable unit 5a are rotated about the shaft B in an oscillating manner by the magnetic attractive force and the restoring force of the resilient body 22.

It will now be described how the optical head unit of the information reading apparatus having the above structure is driven.

The operation of the scanning driving mechanism of the information reading apparatus of the present embodiment will be described with reference to FIGS. 1A to 1C. In FIG. 4, the upper part shows a detection value of the sensor coil (representing the oscillation state of the movable unit) and the lower part shows the voltage applied to the coil.

For example, suppose that the coil side of the permanent magnet 21 is an S pole. The scanning mirror 11 of the movable unit 5a is set in a direction perpendicular to the edge 3a of the base plate 3, as mentioned above. This position of the scanning mirror 11 is the initial position.

A predetermined voltage is applied to the coil 20 on the basis of the scan permission signal shown in FIGS. 5 and 6 (described later), thereby generating a magnetic field of N pole and causing an attractive force acting on the permanent magnet 21. The permanent magnet 21 of the movable unit 5a is swung by the attractive force to the m side with respect to the shaft B functioning as a support point (i.e. central point). On the other hand, the scanning mirror 11 is swung to the m' side.

Then, if the application of the predetermined voltage to the coil 20 is stopped, the permanent magnet 21 is swung to the opposite n side and the scanning mirror 11 is swung to the opposite n' side by the restoring force of the resilient body 22, so as to return to their original positions. If the permanent magnet 21 have gone beyond the original position by the inertia force and reached a certain point based on the spring coefficient, the permanent magnet 21 returns to the m side. At this time, a predetermined voltage is applied to the coil 20 once again to generate an N-pole magnetic field and cause an attractive force. The movable unit 5a is oscillated at a predetermined number of oscillations by the timing of application of the predetermined voltage and the resilient force of the resilient body. With this oscillation operation, the laser beam is reflected and scanned by the emission unit 11a of the scanning mirror.

FIG. 5 shows the structure of a driving circuit including a section for braking the driving unit 5b of the information reading apparatus.

The driving circuit comprises an analog signal generating circuit 31, a scan driving circuit 33 for oscillating the movable unit 5a , a laser diode (LD) driving circuit 34, a digital data generating circuit 35, and a control circuit 32 for controlling these circuits. These circuits are integrated in a single custom IC and are arranged on the base plate 3. The custom IC is operated by two control signals, i.e. a scan permission signal and a laser emission permission signal.

As is shown in FIG. 6, the scan driving circuit 33 provided on the base plate 3 is connected to one terminal of a primary coil 41a and one terminal of a secondary coil 41b of an electromagnetic coil 41 (coil 20). The other terminal 41a' of the primary coil is supplied with a desired voltage obtained by transforming a power supply voltage Vcc in a power supply voltage control circuit 44. The other terminal 41b' of the secondary coil is connected to a reference potential of AC GND. The terminals 41a and 41a' of the primary coil are connected to current paths of short-circuit sections 42 and 43 comprising transistors. When the short-circuit sections 42 and 43 are turned on simultaneously, the terminals 41a and 41a' of the primary coil are connected to the ground.

The control lines of the short-circuit sections 42 and 43 are connected to a time constant section comprising a capacitor C and a resistor R. Even if the scan permission signal is cut off and the power supply is stopped, the short-circuit sections 42 and 43 are activated for the time being. The short-circuit sections 42 and 43 are connected to the power supply voltage control circuit 44 so as to synchronize with an operation permission signal for controlling the turn-on/off of the information reading apparatus.

In the driving circuit thus constructed, if the user finished reading of information and wishes to stop the scanning, the scan permission signal is stopped. In this case, if an H level signal is supplied to the power supply voltage control unit 44 and short-circuit sections 42 and 43, the voltage output from the power supply voltage control circuit 44 is stopped and the short-circuit sections 42 and 43 connected to the terminals 41a and 41a' of the primary coil of the electromagnetic coil 41 are connected to the ground GND. Thus, the electromotive force generated in the electromagnetic coil 41 is flown to the GND via a resistance component of the coil itself and the kinetic energy is quickly consumed. Accordingly, the movable unit is braked and the oscillation thereof is stopped.

FIG. 13 shows waveforms of a scan permission signal and the electromotive force of a coil in the prior art. These waveforms correspond to the waveforms of the electromotive force of the sensor coil in the present embodiment in the case where the short-circuit sections 42 and 43 are not turned on.

FIG. 7 shows waveforms of the scan permission signal and the electromotive force of the coil in the present embodiment. Specifically, FIG. 7 shows the waveform of the electromotive force generated by the sensor coil in the case where the short-circuit sections 42 and 43 have been turned on and the terminals 41a and 41a' of the primary coil of the electromagnetic coil 41 have been set at a ground potential.

In the prior-art structure, the coil is not turned off until the next scan permission signal is applied. As a result, abnormal oscillation occurs at turn-on time (t2).

In the present embodiment, by contrast, if the scan permission signal is turned off (t1), the terminals 41a and 41a' of the primary coil of the electromagnetic coil 41 are set at the ground potential and the generated coil voltage is quickly attenuated. The reference voltage is substantially kept until the scan permission signal is turned on once again (t2). Thus, when the next scan permission signal is applied, the electromotive force of the coil is stably generated.

As has been described above, when the movable unit 5a (scanning mirror 11) is set from the operation permission state to the non-operative state, the short-circuit sections connect the terminals of the electromagnetic coil and the GND. Thus, the voltage of the electromagnetic coil generated by the rotation of the movable unit is let to flow to the GND and is quickly consumed. Thus, the movable unit is immediately stopped. Accordingly, the movable unit can be re-started stably with a short interval.

According to this mirror driving device, the scanning mirror is oscillated by using the attractive force of the permanent magnet and coil and the restoring force of the resilient body, without using the conventional small-sized, high-precision motor. The mirror driving system can be reduced in size and weight, with simple structure. The mirror driving apparatus can be manufactured at low cost, without using expensive parts.

Furthermore, the fixed unit side portion of the plate-like resilient body used in the present embodiment is clamped and fixed by resilient dampers on both sides. Thereby, warp or twist of the resilient body can be prevented when it restores to the original shape, and linear scanning of the laser beam can be realized. Since the length of the damper is set to be less than the distance between the fixed unit and the center of oscillation (i.e. less than ½ of the length of the resilient body), the characteristic frequency of the resilient body does not vary.

A modification of the mirror driving device of the present embodiment will now be described.

Figure 11:
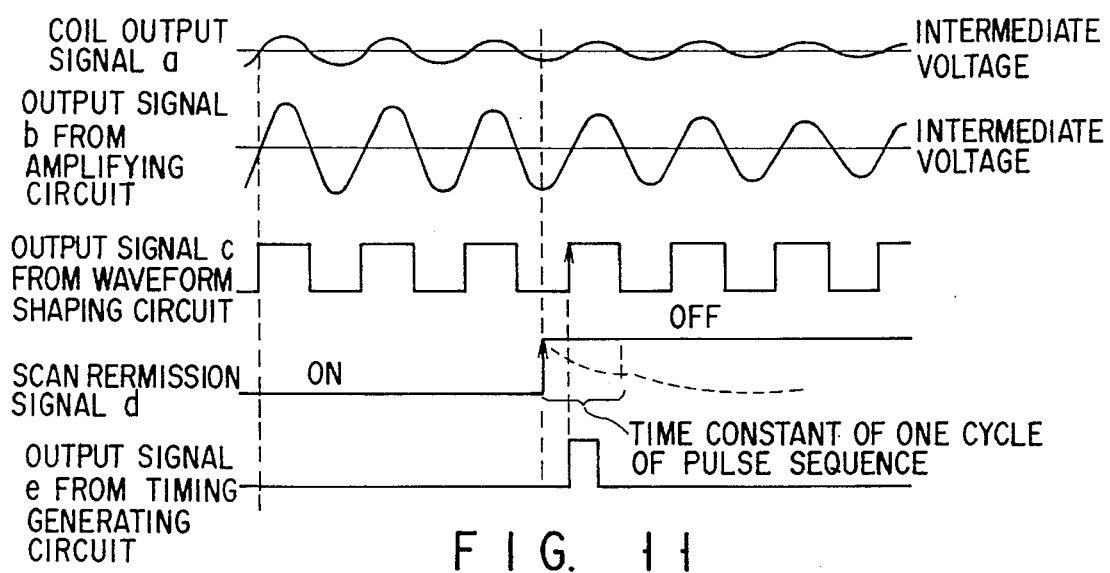
FIG. 11 shows waveforms in various parts of the apparatus shown in FIG. 10.

The structure of the mirror driving device of this modification is the same as that shown in FIG. 1, but the operation thereof differs. FIG. 10 shows the structure of a braking apparatus in the modification and FIG. 11 shows waveforms of the respective sections of the braking apparatus.

In this braking apparatus, one terminal 41b of a secondary coil of an electromagnetic coil 41 is connected to an amplifying circuit 51. A signal synchronizing with the oscillation of the movable unit 5a is amplified to an optimal level and converted to a pulse sequence by a waveform shaping circuit 52. The pulse sequence generated by the waveform shaping circuit 52 is supplied to a timing generating circuit 53 in phase with the rising edge of the scan permission signal. A control current for the electromagnetic coil is flown to the ground via a shorting circuit 54 connected to one terminal 41a of a primary coil of the electromagnetic coil 41 at a pulse width output from the timing generating circuit 53.

The terminal 41a of the primary coil is also connected in parallel to the driving circuit within the custom IC.

With the braking apparatus, if the scan permission signal is input to the scan driving mechanism, the control current is flown to the primary coil of the electromagnetic coil 41 from the driving circuit within the custom IC. If the control current is supplied, the permanent magnet 21 fixed to the movable unit 5a is attracted to the electromagnetic coil 41 and the oscillation starts. The amplifying circuit 51 is connected to the terminal 41b of the secondary coil and AC-amplifies the voltage occurring in the secondary coil up to a proper level. The amplified signal is converted to a pulse sequence synchronizing with the oscillation of the movable unit 5a by the waveform shaping circuit 52. The duty ratio of the converted pulse sequence should desirably be 50%.

Subsequently, the timing generating circuit 53 makes the phase of the change point, at which the scan permission signal d has been set in the off state, agree with the phase of the pulse sequence generated when the permanent magnet 31 has moved away from the electromagnet 41, and a pulse generating unit (not shown) generates a pulse for a predetermined time period. This pulse activates the shorting circuit 54 and lets the current flow through the primary coil to the ground for a predetermined time period. Thus, the permanent magnet is instantaneously attracted towards the electromagnetic coil 41, and the oscillation of the movable unit is stopped.

As has been described above, when the movable unit has been set from the operative state to the non-operative state, the phase of the voltage occurring in the electromagnetic coil during oscillation is monitored. The moment the reading apparatus has been set in the non-operative state, the braking pulse is applied for a predetermined time period and the movable unit is stopped immediately. That is, the braking pulse is applied for a predetermined time period at the time the movable unit has been set in the non-operative state and the movable unit is stopped instantaneously. Thus, even if the scan permission signal is input shortly after the movable unit is set in the non-operative state, the movable unit can be activated stably and quickly.

Furthermore, in the above-described braking apparatus, when the movable unit 5a is stopped, both terminals 41a and 41a' of the primary coil of the electromagnetic coil 41 are connected to the ground and short-circuited. However, the movable unit 5a can be stopped without connecting the terminals to the ground.

When the movable unit 5a approaches the electromagnetic coil 41 in accordance with the phase of the voltage generated by the rotation of the movable unit 5a, a pulse is applied to temporarily generate such a magnetic field as to repel the permanent magnet and brake the rotation. On the other hand, when the movable unit 5a moves away from the electromagnetic coil 41, a pulse is applied to temporarily generate such a magnetic field as to attract the permanent magnet and brake the rotation.

Specifically, an electromagnetic brake can be applied to the electromagnetic coil 41 so as to stop the rotation of the movable unit 5a.

Additional advantages and modifications will be readily available to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reading apparatus comprising:

a light source for generating a laser beam;

reflection means having an emission mirror unit for reflecting the laser beam and emitting the laser beam towards an optical pattern representing information in a form of a predetermined pattern, and a condensing mirror unit for condensing a reflection beam from said optical pattern in a predetermined direction, said condensing mirror unit being integrally formed with said emission mirror unit;

light detection means having a light receiving surface opposed to said condensing mirror unit, said light receiving surface being located within a range of an optical path of the reflection beam received by said condensing mirror unit in such a position as not to interrupt the emitted beam, said light receiving surface receiving the reflection beam condensed by said condensing mirror unit, and the received reflection beam being converted to an electric signal corresponding to said optical pattern;

a base plate on which said light source and said light detection means are arranged;

a movable unit having one end portion provided with said reflection means and another end portion provided with a magnet;

a support unit, fixed on said base plate, for rotatably supporting said movable unit such that said movable unit is rotatable about a substantially middle portion of said movable unit;

a plate-like resilient body for coupling said support unit to said movable unit provided with said reflection means;

a rotation drive unit for repeatedly rotating said movable unit in an oscillating manner by generating a magnetic force for attracting said magnet at a predetermined timing and by making use of a restoring force of said resilient body; and a rotation braking unit for braking and stopping rotation of said movable unit by consuming a primary winding potential of a coil, provided on said rotation drive unit, for generating a magnetic force.

2. The information reading apparatus according to claim 1, further comprising filter means for passing only the laser beam reflected from said optical pattern, said filter means being provided on the light receiving surface of said light detection means.

3. The information reading apparatus according to claim 1, further comprising a handle unit which is portable, and wherein said handle unit includes a switch which switches said light source between ON and OFF states.

4. The information reading apparatus according to claim 1, further comprising resilient body warp correction means which fixes a resilient damper to one or both sides of said resilient body, said damper having a length less than a distance between a center of said resilient body and each of both ends of said resilient body which are fixed to said support unit and said movable unit, thereby maintaining planar rotation of said resilient body while keeping a characteristic frequency of said resilient body.

5. The information reading apparatus according to claim 1, wherein said rotation braking unit includes a short-circuit section for setting a primary winding potential of said coil at ground potential, said rotation braking unit setting a voltage caused in said coil by a rotation at a ground potential level by said short-circuit section, thereby attenuating the voltage of said coil and stopping the rotation of said movable unit.

6. The information reading apparatus according to claim 1, wherein said rotation braking unit includes a short-circuit section for setting a primary winding potential of said coil at ground potential, and a waveform shaping unit for generating a pulse sequence of signals synchronizing with the rotation of said movable unit, and wherein when said movable unit has been set from a scan state to a non-scan state, said short-circuit section is turned ON in accordance with a phase of a voltage caused in said coil by the rotation and said coil is made to attract said magnet of said movable unit temporarily when said movable unit rotates away from said coil, thereby stopping said movable unit.

7. The information reading apparatus according to claim 6, wherein said pulse sequence generated by said waveform shaping unit synchronizes with a phase of the voltage caused in the rotating coil, and has a duty ratio of 50%.

8. The information reading apparatus according to claim 1, wherein said movable unit further comprises:

a run-out reducing unit having a projecting shape, said run-out reducing unit being provided below said movable unit; and a groove member, fixed to said base plate, for movably engaging said run-out reducing unit and preventing run-out of a shaft of said movable unit.

9. The information reading apparatus according to claim 1, wherein said rotation braking unit comprises a waveform shaping unit for generating a pulse sequence formed by a signal synchronizing with the rotation of said movable unit, and wherein when said movable unit has been switched from a scan state to a non-scan state and said movable unit rotates and approaches said coil in accordance with a phase of the voltage generated in said coil by the rotation, a pulse sequence is applied to said coil so as to generate a magnetic field to temporarily repel said magnet of said movable unit, thereby stopping the rotation of said movable unit.

10. The information reading apparatus according to claim 1, wherein said rotation braking unit comprises a waveform shaping unit for generating a pulse sequence formed by a signal synchronizing with the rotation of said movable unit, and wherein when said movable unit has been switched from a scan state to a non-scan state and said movable unit rotates and moves away from said coil in accordance with a phase of the voltage generated in said coil by the rotation, a magnetic field to temporarily attract said magnet of said movable unit is caused in said coil, thereby stopping the rotation of said movable unit.

* * * * *